(12) United States Patent  (10) Patent No.: US 12,493,281 B2
Biswas et al.  (45) Date of Patent: Dec. 9, 2025

(54) BATTERY MANUFACTURING PROCESSES BASED ON ACOUSTIC AND PROCESS SIGNAL ANALYSIS

(71) Applicant: LIMINAL INSIGHTS, INC., Emeryville, CA (US)

(72) Inventors: Shaurjo Biswas, Emeryville, CA (US); Andrew Hsieh, Berkeley, CA (US); Marc Juzkow, Livermore, CA (US); Shan Dou, Emeryville, CA (US); Barry Van Tassell, El Cerrito, CA (US)

(73) Assignee: LIMINAL INSIGHTS, INC., Emeryville, CA (US)

( * ) Notice: Subject to any disclaimer, the term of this patent is extended or adjusted under 35 U.S.C. 154(b) by 766 days.

(21) Appl. No.: 17/327,497

(22) Filed: May 21, 2021

(65) Prior Publication Data

US 2021/0365009 A1  Nov. 25, 2021

Related U.S. Application Data

(60) Provisional application No. 63/028,143, filed on May 21, 2020.

(51) Int. Cl.
*G05B 19/4155* (2006.01)
*G10L 25/51* (2013.01)
*H04R 1/08* (2006.01)

(52) U.S. Cl.
CPC ........ *G05B 19/4155* (2013.01); *G10L 25/51* (2013.01); *H04R 1/08* (2013.01); *G05B 2219/31372* (2013.01)

(58) Field of Classification Search
CPC ...... G05B 19/4155; G05B 2219/31372; G10L 25/51; H01M 10/04; H01M 10/42; H04R 1/08
See application file for complete search history.

(56) References Cited

U.S. PATENT DOCUMENTS 8,813,552 B2 * 8/2014 Matsumoto .......... G01B 11/306
73/632
2012/0111103 A1  5/2012 Matsumoto et al.
2021/0365009 A1 * 11/2021 Biswas ................ H01M 10/42

FOREIGN PATENT DOCUMENTS

CN    102282452 A   12/2011
CN    106125694 A   11/2016
JP    2009043469 A   2/2009
JP    2010101656 A   5/2010
(Continued)

OTHER PUBLICATIONS

International Search Report mailed Aug. 26, 2021.
Korean Notice of Grounds for Rejection issued Apr. 30, 2025 in corresponding Korean Application No. 10-2022-7044368.

*Primary Examiner* — Minh N Trinh
(74) *Attorney, Agent, or Firm* — Polsinelli PC (57) ABSTRACT

Systems, methods, and computer-readable media are provided for controlling a battery manufacturing process. For instance, signal based analysis that can include audio signal analysis can be performed during a first process step of a battery manufacturing process. Based on the signal based analysis, at least one adjustment can be determined for a second process step of the battery manufacturing process. Information associated with the at least one adjustment can be provided to the second process step.

7 Claims, 6 Drawing Sheets

(56) References Cited

FOREIGN PATENT DOCUMENTS

| | | |
|---|---|---|
| JP | 2011029084 A | 2/2011 |
| JP | 5358335 B2 | 12/2013 |
| KR | 20110092358 A | 8/2011 |
| WO | 2011013180 A1 | 2/2011 |

* cited by examiner

BATTERY MANUFACTURING PROCESSES BASED ON ACOUSTIC AND PROCESS SIGNAL ANALYSIS

CROSS-REFERENCE TO RELATED APPLICATIONS

This application claims the benefit of priority under U.S.C. § 119(e) to U.S. Provisional Patent Application 63/028,143, filed on May 21, 2020, entitled, BATTERY MANUFACTURING PROCESSES BASED ON ACOUSTIC SIGNAL ANALYSIS, which are hereby expressly incorporated herein by reference in its entirety.

STATEMENT REGARDING FEDERALLY SPONSORED RESEARCH OR DEVELOPMENT

This invention was made with U.S. Federal government support under Grant No. AR0000866 awarded by the Department of Energy, Advanced Research Projects Agency. The U.S. Federal government has certain rights in the invention.

FIELD OF DISCLOSURE

Disclosed aspects are directed to improving and controlling battery manufacturing processes based on acoustic signal and/or process signal based monitoring of various process steps. More specifically, aspects of the present technology are directed to process improvements and process control based on feedback and/or feedforward of acoustic signal and/or process signal based analysis obtained during one or more process steps involved in the manufacturing of battery cells.

BACKGROUND

Demands on production of battery cells are on the rise owing to an increase in demand for battery cells from various industries such as consumer electronics, automotive, clean energy, etc. Efficient and fast battery diagnostics methods are important for increasing quality, lifetime, and manufacturing process efficiency for batteries. In the case of manufacturing and production, reducing costs (e.g., price per kilo Watt hour (kWh)) is an important goal. Production costs can be reduced by optimizing existing processes and/or introducing new technologies. For example, technological advances in the area of improved monitoring and diagnostics can lead to cost efficiencies both by shortening production process times (thus also reducing energy consumption during production) and by reducing wastage due to damaged cells and cell parts.

However, there is a need for fast, non-destructive, and inexpensive monitoring methods to monitor battery cell components and cells as they are processed through various stages of cell manufacturing at scale. The lack of effective monitoring during the production processes can lead to low yield, poor quality, and inefficient resource utilization.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for controlling a battery manufacturing process. According to at least one illustrative example, a method of controlling a battery manufacturing process is provided. The method can include, performing signal based analysis during a first process step; determining at least one adjustment to a second process step based on the signal based analysis performed during the first process step, wherein the first process step and the second process step correspond to a battery manufacturing process; and providing information associated with the at least one adjustment to the second process step.

According to at least one illustrative example, an apparatus for controlling a battery manufacturing process is provided. In some aspects, the apparatus can include memory having stored thereon computer-readable instructions and one or more processors configured to perform signal based analysis during a first process step; determine at least one adjustment to a second process step based on the signal based analysis performed during the first process step, wherein the first process step and the second process step correspond to a battery manufacturing process; and provide information associated with the at least one adjustment to the second process step.

According to at least one illustrative example, a non-transitory computer-readable medium is provided for controlling a battery manufacturing process. In some aspects, the non-transitory computer-readable medium can include instructions that, when executed by one or more processors, cause the one or more processors to perform signal based analysis during a first process step; determine at least one adjustment to a second process step based on the signal based analysis performed during the first process step, wherein the first process step and the second process step correspond to a battery manufacturing process; and provide information associated with the at least one adjustment to the second process step.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration and not limitation.

DETAILED DESCRIPTION

Aspects of the present technology are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the phrase "aspects of the disclosure" does not require that all aspects of the present technology include the discussed feature, advantage or mode of operation.

The terminology used herein is for the purpose of describing particular aspects only and is not intended to be limiting of aspects of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Systems, apparatuses, processes (also referred to as methods), and computer-readable media (collectively referred to as "systems and techniques") are disclosed for improving one or more process steps in the manufacture or production of electrochemical energy storage devices (e.g., batteries, battery cells, and/or any components thereof). In some examples, the systems and techniques can be implemented by using an acoustic signal and/or a process signal to monitor one or more steps in a manufacturing process for battery cells in order to provide feedback and/or feedforward data that can be used to modify, adjust, or otherwise implement one or more steps in the manufacturing process.

Figure 1:
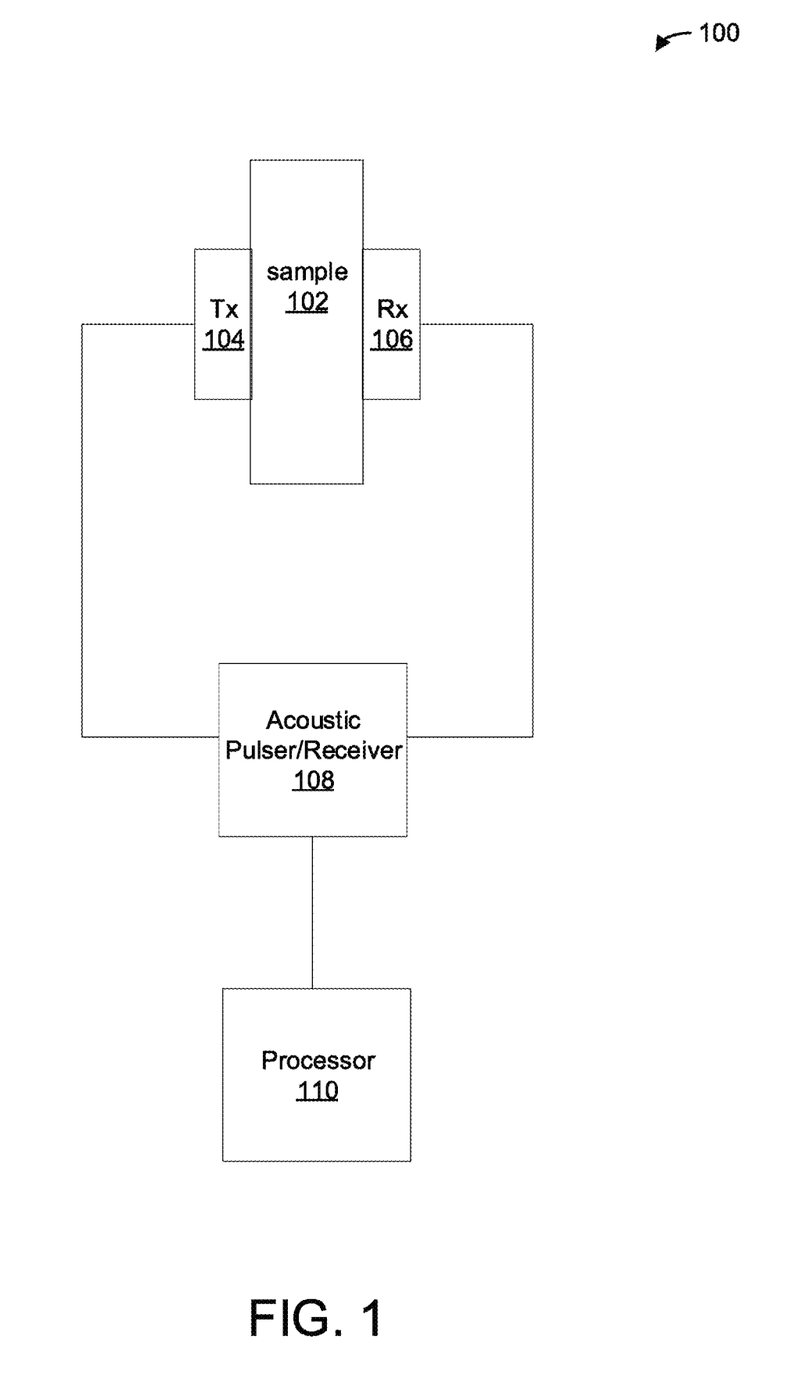
FIG. 1 illustrates an apparatus for acoustic signal based analysis of a sample, according to aspects of this disclosure.

FIG. 1 illustrates an example system 100 for analyzing a sample 102 using acoustic signal and/or process signal based analysis, according to aspects of the disclosure. In some examples, the sample 102 can include a battery cell or a component thereof during any stage of production or manufacture of the battery cell or the component. For instance, the sample 102 can include a battery cell, electrolytes in various stages of wetting/distribution through a battery cell, one or more electrodes of the battery cell, thin films, separators, coated sheets, current collectors, electrode slurries, and/or any material associated with the manufacture thereof. Example production stages and components involved therein will be described with reference to FIG. 2 in more detail.

In some aspects, the system 100 can include a transmitting transducer Tx 104 or any other components suitable for sending excitation sound signals into the sample 102 (e.g., for transmitting a pulse or pulses of ultrasonic or other acoustic waves, vibrations, resonance measurements, etc., through the battery cell). In some examples, the system 100 can include a receiving transducer Rx 106 or other component suitable for receiving and/or sensing signals (e.g., sound signals, reflected signals, transmitted signals, and/or any other signals associated with signals transmitted by the Tx transducer 104).

In some aspects, the signals transmitted by the Tx transducer 104 (e.g., from a side of the sample 102 on which the Tx transducer 104 is located) may include input excitation signals. In some cases, reflected signals (e.g., from another side of the sample 102) may include echo signals. As used herein, response signals may include the input excitation signals (e.g., signal transmitted by Tx transducer 104) and/or any reflected signals, echo signals, sound signals, etc. In some examples, the Tx transducer 104 may also be configured to receive response signals, and similarly, the Rx transducer 106 may also be configured to transmit acoustic and/or other types of excitation signals. Although FIG. 1 illustrates separate components for Tx and Rx, those skilled in the art will recognize that each component may perform either or both the Tx and Rx functions. In some embodiments, one or more Tx transducers (e.g., Tx transducer 104) and/or one or more Rx transducers (e.g., Rx transducer 106) can be placed on the same side or wall of the sample 102, or on different (e.g., opposite) sides of sample 102.

In some examples, an acoustic pulser/receiver 108 can be coupled to the Tx and Rx transducers 104, 106 for controlling the transmission of acoustic signals (e.g., ultrasound signals) and receiving response signals. The acoustic pulser/receiver 108 may include a controller (not illustrated) for adjusting signal parameters such as the amplitude, frequency, and/or other signal features of the transmitted signals. In some cases, the acoustic pulser/receiver 108 may also receive the signals from the Rx transducers 106. In some examples, the acoustic pulser/receiver 108 may be configured as a combined unit, while in some examples, an acoustic pulser for transmitting excitation signals through the Tx transducer 104 can be a separate unit in communication with a receiver for receiving the signals from the Rx transducer 106. In some configurations, a processor 110 in communication with the acoustic pulser/receiver 108 can be configured to store and analyze the response signal waveforms according to aspects of the present technology. Although illustrated as a single processor, the processor 110 can include one or more processors, including remote processors, cloud computing infrastructure, etc.

As noted above, FIG. 1 illustrates a configuration that includes a single Tx transducer 104 and a single Rx transducer 106. In some aspects, one or more than Tx transducers and/or Rx transducers can be placed in one or more spatial locations relative to the sample 102. In some examples, utilizing multiple transducers at different locations can be used to determine a spatial variation of acoustic signal features across the sample 102. In some aspects, a multiplexer (not illustrated) can be configured to be in communication with the acoustic pulser/receiver 108 for separating and channeling the excitation signals to be transmitted and the response signals received. In some examples, various acoustic couplants can be used (e.g., solid, gel, liquid, or combinations thereof) for making or enhancing contact between the Tx and Rx transducers 104, 106 and the sample 102. In some cases, various attachment or fixturing mechanisms (e.g., pneumatic, compression, screws, etc.) can also be used for establishing or enhancing the contact between the Tx and Rx transducers 104, 106 and the sample 102.

In some aspects, the system illustrated in FIG. 1 can be used to analyze and/or process one or more signals relating to the production of sample 102 to determine one or more parameters or data relating to the manufacturing process (e.g., of a battery cell). In some examples, the data can include data associated with functional quality testing results from testing performed anywhere during the manufacturing process (e.g., formation capacity, self discharge voltage drop, etc.). In further examples, the data can include process inspection data (e.g., weight of electrolyte injected during fill process, beta gage data from electrode inspection). In further examples, the data can include material and/or component specifications and/or quality control data from upstream suppliers or vendors. In further examples, the data can include environmental data (e.g., temperature, humidity, etc.). In further examples, the data can include data streams produced by other process equipment (e.g., calendering pressure, dry cell weight, electrode thickness measurements, etc.) In one illustrative example, during electrolyte wetting (discussed in connection with FIG. 2), parameters and/or manufacturing process data that can be used by system 100 can include the mass or volume of electrolyte added; calendering pressure (earlier in process); number or intensity of vacuum steps during soak; information about the cell's composition; information about raw materials from supplier; environmental factors like temperature, pressure, and humidity; inspection results from earlier process steps; custom/arbitrary data provided by customer/user.

Figure 2:
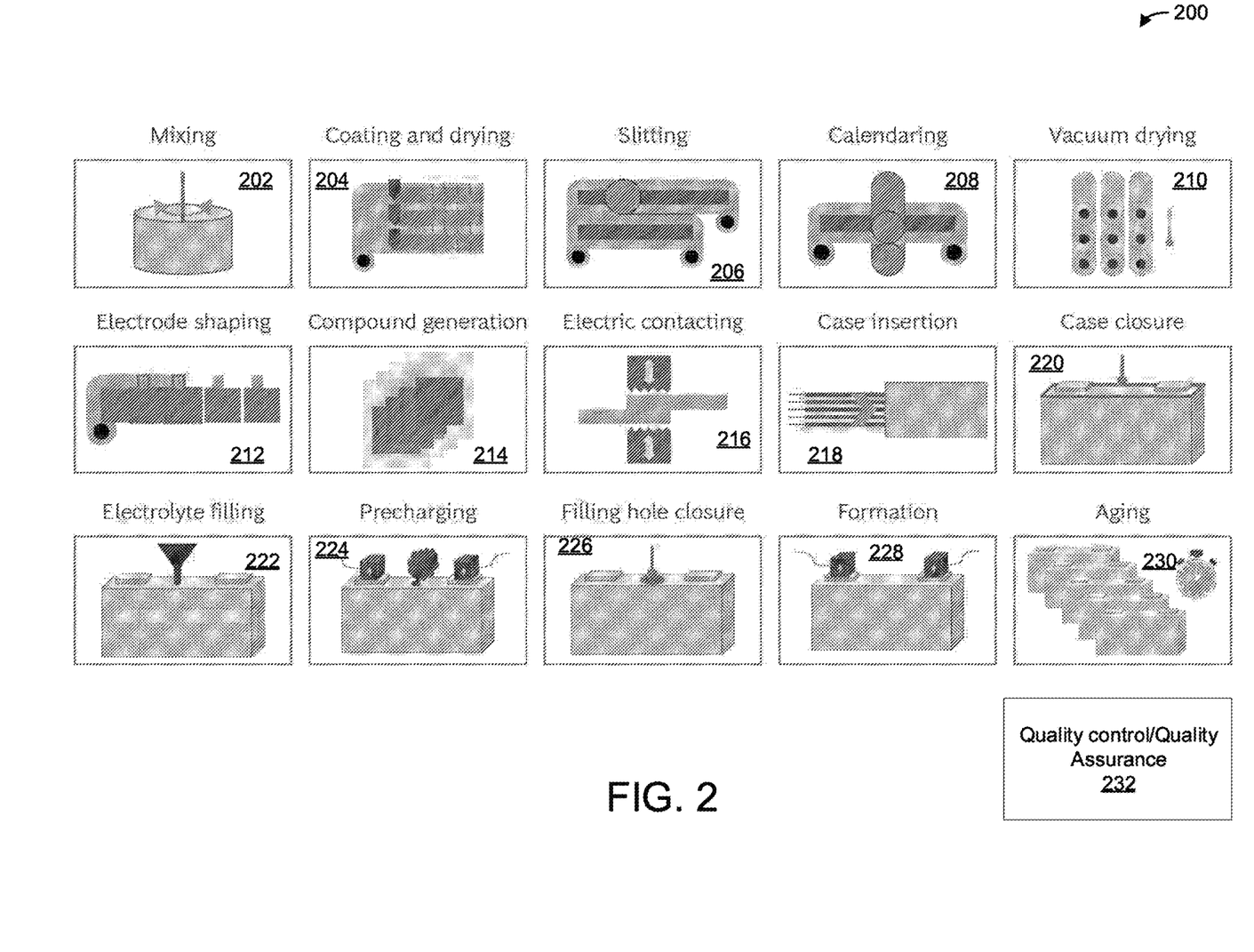
FIG. 2 illustrates an example process for manufacturing of battery cells, according to aspects of this disclosure.

FIG. 2 illustrates an example of a production or manufacturing process 200 of one or more battery cells. As illustrated, process 200 includes stages or process steps 202 to 232. In some examples, the process steps 202 to 232 can be performed in sequence (e.g., production of a battery cell may progress through an ascending order of process steps 202 to 232). In other examples, one or more of process steps 202 to 232 included in process 200 can be excluded or performed in a different order). As used herein, feedback or feedback control data can include information from a later-in-time process step that is used to influence the outcome of an earlier process step. Similarly, a reference to a feedforward or feedforward control data can include information from an earlier-in-time process step that is used to influence the outcome of a later process step.

In various aspects of this disclosure, information gathered based on an acoustic signal and/or process signal based analysis (e.g., conducted using a setup such as system 100) in one process step can be used in one or more other process steps using any suitable combination of feedback and/or feedforward of the acoustic signal and/or process signal based analysis. In some examples, acoustic signal and/or process signal based analysis in one process step can be used in the same process step. In some examples, feedback data and/or feedforward data can be used to improve the overall quality of battery cells produced using the manufacturing process 200, efficiency/cost of the manufacturing process 200, improvement in yield/reduction in wastage of the battery cells produced using the manufacturing process 200, and/or improve efficiency, functionality or performance of one or more of process steps 202 to 232.

Turning to FIG. 2, the manufacturing process 200 can start with a process step 202 for mixing an electrode slurry. In some examples of manufacturing batteries (e.g., lithium ion batteries), active electrode materials such as active anode or cathode electrode materials are mixed with binder and conductive materials in solvents to form a slurry, which is then coated or spread on a web or sheet of metallic current collector sheet, which upon being baked and dried yields the electrodes used in the batteries. In some aspects, coating the slurry uniformly on the metallic current collector can be a significant factor in proper functioning and longevity of the batteries. Since the slurry is highly viscous and contains a large amount of solid particles and liquid components of varying densities, obtaining uniformly mixed slurry for consistency in coating can be a complex and challenging process. As a result, electrode coatings may show significant differences in composition along and across the current collector web. Detecting composition differences and accordingly fabricating batteries with more evenly distributed electrode coatings can lead to increased battery performance and lifetime. Thus, the present technology can improve process step 202 for mixing the slurry, which can improve one or more subsequent process steps as well as the overall quality of the resulting batteries which use the electrodes formed from the slurry.

Process step 204 includes the coating and drying phases referenced with respect to step 202 above. For example, the slurry, upon being coated on a metal sheet or current collector is dried. The drying can include a drying oven where the coated material is dried based on the application of heat. Coating the slurry on the metal sheet can be used in the formation of thin-sheet components for use in electrodes, separators, exterior packaging, or other battery components. It is important to ensure high quality of these thin-sheet components, e.g., in terms of avoiding non-uniformity, damages, contaminations, foreign inclusions, coating-substrate debonding, or improper/leaky packaging, etc., during the coating processes to minimize the impact on safety and performance of the batteries. During battery production, in-line monitoring and early detect of these quality issues are desirable for lowering scrap rate, which in turn could dramatically reduce production costs for batteries (e.g., lithium-ion batteries). The systems and techniques disclosed herein (e.g., acoustic analysis) can be used to prevent and/or minimize quality issues or drift in the manufacturing process by implementing corrective measures that can be fed back to prior mixing step 202 and the current coating and drying process step 204, and/or also fed forward to compensate for electrode issues in subsequent steps of cell and components fabrication.

Process step 206 includes slitting, where the coated sheets or films can be slit or diced to suitable dimensions. For example, wider electrode sheets can be coated with slurry to then be sliced or slit into strips of lower width in some examples. The slitting process can also introduce non-uniformities or unevenness, and monitoring these to identify any defects can improve the quality.

Process step 208 includes calendering, where the coated sheets are compressed to obtain the desired thickness, bulk density, and porosity of the electrodes. Battery production can be improved by monitoring the calendering process step such that it is implemented correctly. For instance, wet and dry, calendered or/and uncalendered electrode coating can be susceptible to defects such as inconsistency in porosity, local density, mass loading, particle agglomeration, and particle size distributions; damages such as voids, streaks, scratches, or cracks; foreign inclusions such as bubbles and contaminant particles (metallic and/or non-metallic); delamination or flaking of electrode coating; debonding between electrode coating and metal current collectors; subsurface variations in porosity or density, etc. While early detection and/or remediation of such defects is desirable, one or more of these defects may not be detectable via optical and other conventional inspections methods. Acoustic signal and/or process signal based analysis can be used to identify one or more defects in the process step 208, where such information can be used in improving one or more other process steps, upstream and/or downstream in cell manufacturing, in addition to eliminating or mitigating the defects in this process step. Conventional process data signals (such as optical or electrical measurements) can be included with measured acoustic signals to improve the fidelity of defect detection and can further enrich the information provided to upstream and/or downstream process steps.

Process step 210 can include vacuum drying which can be performed on calendered sheets. The vacuum drying can be in addition to the heated drying described with reference to process step 204. In some examples, this step 210 can happen after step 204 or 208. The drying temperature, duration of exposure to vacuum, and vacuum pressure can have significant impact in the amount of moisture or solvent remaining in the electrodes, which in turn can impact the quality of the cell.

Process step 212 can include electrode shaping, where the strips of electrode sheets obtained from slitting in the process step 206 (upon calendering and vacuum drying) can be cut or diced into units of particular shapes (e.g., square or rectangular shape with tabs) for use in batteries. Accurate electrode shaping is important for both jellyroll or cut-and-stack type cells. Poorly cut electrodes can results in electrode misalignment during compound generation step 214. Electrode shaping or slitting can also generate burrs and metal particles that can get embedded in the electrode stack.

Process step 214 can include compound generation where two or more units of the shaped electrodes can be combined or compounded. This is the process step for assembling the anode, cathode, and separator into a jellyroll or a stack.

Process step 216 can include electrical contacting where a compound of two or more electrode units or current collectors can be coupled through welding or other methods to each other and/or to external electrical contacts or tabs. Tab misalignment, poor weld quality, and metal particle impurities are common issues that can occur during process step 216. These issues can be monitored with acoustic measurement and analysis (e.g., conducted using a setup such as system 100) during step 216 or subsequent steps 218-232 during cell manufacturing. Such information gathered can be used in a feedback path to step 216 to make corrective process parameter changes.

Process step 218 can include case insertion where a one or more electrodes with electrical contacts and separator can be inserted into a suitable case for the electrolyte fill and soaking, and solid electrolyte interphase (SEI) layer formation.

Process step 220 can include case closure where the electrodes stack or jellyroll is inserted into the case are sealed.

Process step 222 can include electrolyte filling and soaking. In some examples, electrolyte fill and soaking can be critical process steps in battery cell production because the evenness of electrolyte distribution and saturation can directly influence the yield rate of expensive downstream processes like formation and aging and the overall yield of the production process. The quality of electrolyte wetting the pores of the electrodes and separators of battery cells has a high impact on structures such as a SEI layer, which is a passivation layer formed on electrode particle surfaces from decomposition products of electrolytes. Similar to electrolyte distribution, the evenness and quality of SEI formation has a strong influence on the overall quality, performance, and safety of the battery cells being produced. The electrolyte wetting quality also affects the self-discharge aging behavior of the battery cell (i.e., the rate of voltage fade while the battery cell is electrically isolated from an external circuit). Poorly wetted areas influence battery cell performance by increasing the internal ionic resistance and decreasing the discharge capacity, cycle life, and safety. The amount and distribution of electrolyte within the battery cell is important for the overall performance of the battery cell. Flooding or depletion of the battery cell electrolyte may severely impair battery cell performance and may cause failures. Thus, precise determination of filling, soaking, or wetting time is also important to ensure that the electrolyte is correctly and sufficiently filled and saturated with electrolyte. Acoustic signal and/or process signal based monitoring techniques can be used to identify various aspects of electrolyte wetting and distribution, where this information can be used to influence the output of one or more of process steps of the manufacturing process 200.

Process step 224 includes precharging, where a certain voltage of charging is applied to the battery cell for a certain duration during electrolyte soaking before formation step 228. In some examples, it is desirable to apply precharging when the electrolyte filling is complete in the process step 222 (e.g., to ensure the current collector does not undergo corrosion). The level of precharging and duration of precharging may also be dependent upon one or more of the previous process steps, such as the electrolyte filling and electrode density.

Process step 226 includes filling hole closure where a hole in the battery's body which is used for electrolyte filling can be closed. Upon closing the hole, further electrolyte filling or depletion, if needed, would be difficult. Therefore, monitoring the previous process steps to ensure that the hole closure is performed at the correct time in the manufacturing process 200 is important. In some aspects, hole closure can be associated with battery cells such as prismatic cells. Monitoring the quality of hole closure, for example if it is welded shut, is also important so that there is no moisture infiltration.

Process step 228 includes SEI formation. Lithium-ion battery formation is the process of performing the initial charge/discharge operation on the battery cell. During this stage, the SEI will be formed at the electrodes (e.g., on an anode). This layer is sensitive to many different factors and can impact battery performance during its life time. Battery formation can take many days depending on the battery chemistry, and is recognized as one of the most expensive process steps in battery cell manufacturing. The impact of previous steps such as the effects and quality of the electrolyte wetting may be observed during the battery formation.

Process step 230 includes aging, where the decay in each battery cell's open circuit voltage is monitored over time (e.g., a self-discharge rate of the battery cell). As previously noted, the electrolyte wetting quality can affect the aging behavior of the battery cell (e.g., the rate of voltage fade while the battery cell is electrically isolated from an external circuit).

Process step 232 includes end-of-line quality control (QC) and quality assurance (QA), where the DC resistance, AC impedance, charge and/or discharge capacity, and open circuit voltage are monitored electrically. Acoustic signal and/or process signal based analysis can be performed on the cells at manufacturing step 232 to identify internal defect, such as electrode and separator tears, folds, damage, electrode misalignment, tab misalignment, metal or other foreign particles, poor electrolyte distribution, poor SEI formation and distribution, etc. In addition to defects, acoustic analysis can be used to estimate the lifetime performance of the cell. This and other information about defects or issues detected during step 232 can be used in a feedback path to the relevant manufacturing process steps to rectify error or improve process yield and cell quality.

Figure 3:
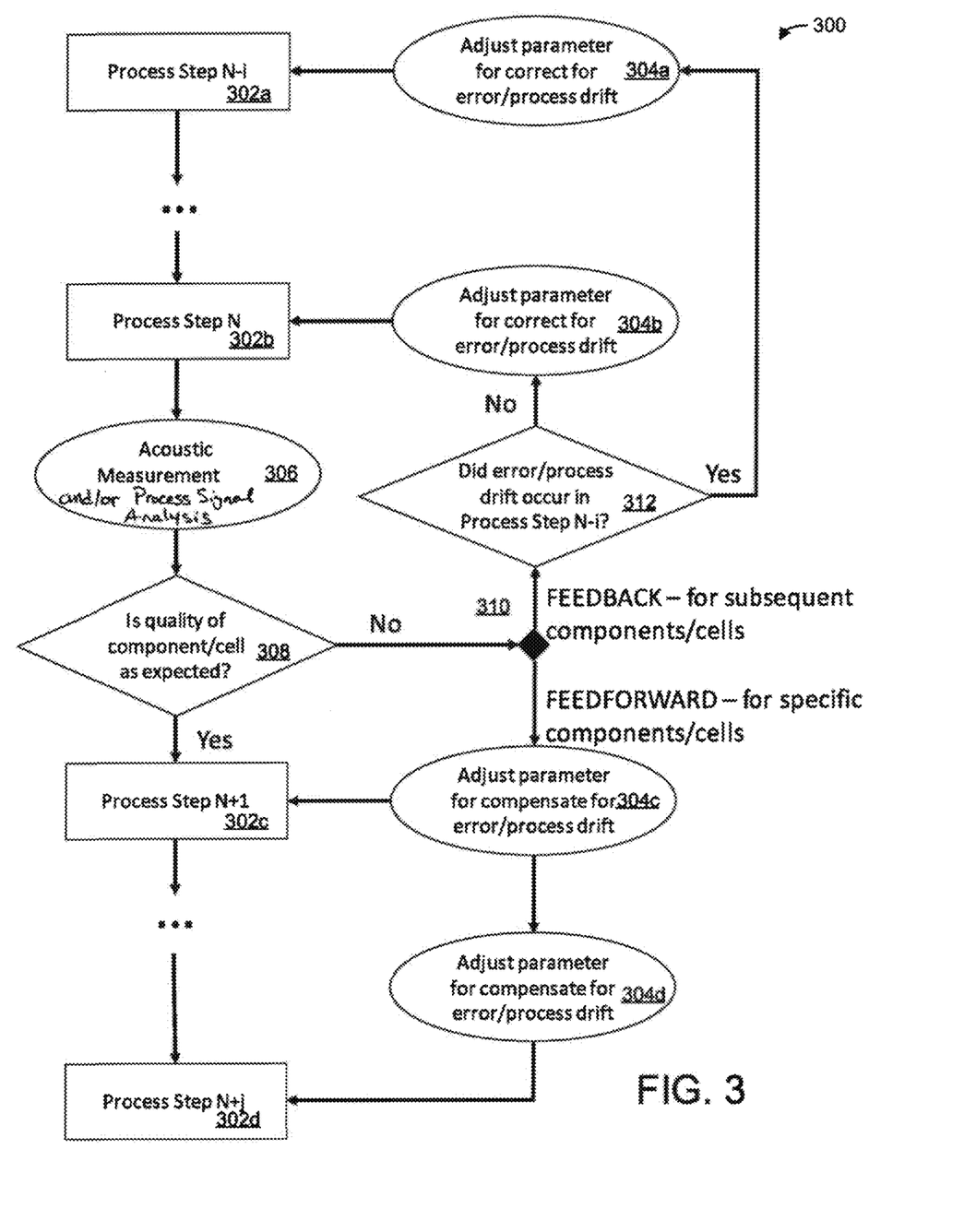
FIG. 3 illustrates an example process for use of acoustic signals and/or process signals in connection with manufacturing of battery cells or battery components battery, according to aspects of this disclosure.

FIG. 3 illustrates an example process for use of acoustic signals and/or process signals in connection with manufacturing of battery cells or battery components. As illustrated, the process steps 302a-d may correspond to one or more of the process steps 202-232 of the manufacturing process 200 or other process steps which may be involved in the manufacturing of a battery or component thereof (e.g., a current batch of cells/components). Furthermore, while FIG. 3 is described with reference to a battery manufacturing process, those skilled in the art will recognize that the present technology is not limited to a particular manufacturing process and can be implemented in connection with any other process.

At process step 306, acoustic measurement and analysis may be performed using, for example, devices and setups as shown with reference to the system 100 in FIG. 1. At a corresponding decision block 308 which may follow each block 306, the acoustic and process signal measurement and analysis system may determine whether the quality of the battery cell or component in the current batch is as expected (e.g., using reference acoustic measurement data of known battery cell or component, or using other metrics).

At each of the decision blocks 308, a decision may be made to proceed to a subsequent process step 302a-d if the quality is as expected (e.g., a measurement or parameter meets or exceeds a threshold). If the quality metric associated with the corresponding process step does not meet a predetermined requirement, the process 300 may proceed to a decision block 310 to determine whether a feedback of the information obtained by the system (e.g., acoustic and/or signal measurement) may be used in any of the manufacturing processes for subsequent batches of components/cells, and/or a feedforward of the information may be used for one or more components/cells in the current batch.

In a decision block 312, if errors/process drift are detected in the process step at which the acoustic analysis was conducted, then adjustments may be correspondingly made to process conditions/parameters for the previous process steps (which may include current process step N) in the manufacture of the subsequent batches, as shown in the blocks 304a, for example. In some aspects, the information may be used by the same process step in the block 304b to improve the current process step 302b, for example. Similarly, the feedforward information may be used to adjust parameters to compensate for the errors/process in subsequent process steps as shown in the blocks 304c-d, for example. In some examples, the process analysis information/data can be used to make adjustments or improvements to the current process as well as subsequent processes (e.g., feedback and feedforward of data).

Process 300 will now be explained with reference to illustrative examples of implementing improvements in the process of manufacturing battery cells/components as described in connection with FIG. 2.

In one example, non-uniform mixing in step 202 can lead to density gradients along the coated electrode in step 204, which results in non-uniform porosity and tortuosity of the electrode after calendering in step 208. Non-uniform porosity of electrodes results in uneven distribution of electrolyte during filling and soaking in step 222. Poor electrolyte distribution across a cell may result in dry spots in the cell, resulting in poor quality solid electrolyte interphase (SEI) formation in step 228, and ultimately poor performance and lifetime of the cell. Density and composition of electrode slurry after mixing step 202 can be monitored with an acoustic signal and/or process signal based analysis (e.g., conducted using a setup such as system 100). Identifying any defects or concerns in the slurry can be used as feedback or feedforward information. For example, in a feedforward mechanism, if slurry mixture inconsistencies, such as inhomogeneity, varying amount of solid particles (e.g. percentage of solids in the mixture) uniformity, consistency, etc., are identified with acoustic analysis, then the information can be used in a feedforward path to the electrolyte filling and soaking step 222 to adapt the soaking process (e.g. allow for a longer time of soaking of this lower porosity electrode in an assembled cell in order for electrolyte distribution to be uniform and thus improve the performance of this specific cell). In another example, the inconsistencies may be reported in the feedback path to the slurry mixer in step 202 to adapt a mixing process (e.g., increase mixing time, mixing speed, mixing temperature, or other) to adjust to the electrolyte uniform distribution issue which was recorded in step 222 based on acoustic analysis.

In some aspects, a device (e.g., system 100) can be used to monitor acoustic signal characteristics of the flow of the slurry through a pipe to electrode coater (e.g., slot die, doctor blade, etc.), and this information may be used as feedback for the slurry. Feedforward of acoustic analysis information gathered from the slurry mixing tank can also be used to make any adjustments to the flow pipe parameters (e.g., to control the speed of the flow of slurry through the pipe).

For example, over the course of manufacturing, sedimentation or settling of the slurry may cause heavier particles to settle and lead to incomplete mixing such as resulting in regions of the slurry in the slurry mixer having higher binder content or lower binder content. Such effects can result in changes to how the slurry gets deposited onto the coater through the pipe to coat the slurry on to the current collector. In some examples, acoustic signaling and/or monitoring of the process can be used to detect sedimentation and/or settling of the slurry.

In some aspects, monitoring one or more of the above components or related processes can be used as feedforward information in the following processes such as coating. For example, monitoring one or more of the devices (e.g., system 100) can determine adjustments to be made to the coating process where the slurry is deposited as electrode slurry on to the current collector. For example, based on the slurry conditions coating process parameters can be controlled, such as guiding decisions on the thickness of the coating layer of the electrode slurry, flow speed of slurry in the coater, width and uniformity of the coating, etc.

The electrode slurry/current collector can be processed in a drying oven for drying upon the coating process. One or more rollers with Tx and Rx transducers embedded for acoustic measurement (e.g., conducted using a setup such as system 100) may convey the electrode slurry coating/current collector through the drying processes. The acoustic measurement devices can provide feedforward information based on the electrode slurry/current collector from step 202 and 204 being monitored to control the drying oven. For example, having determined a particular level of wetness, thickness, consistency, etc., based on the acoustic signal and/or process signal based analysis conducted using the acoustic based measurement devices, an optimum drying time and temperature may be determined for the electrode slurry/current collector, and this information can be used to program settings for the drying oven. In some examples, the data collected using acoustic signal and/or process signal can be used together with other data such as manufacturing process data to determine adjustments or modifications to the process and/or any associated process parameters. In some examples of coating and/or calendering (see, e.g., process steps 204, 208) inconsistencies measured in the coating of the electrode slurry can also be fed back to the slurry mixing or binder formation processes in addition to or as an alternative to feeding forward the information to the heating/drying phases. Slurry mixing speed, drying temperature, and similar process parameters can be included in the acoustic signal analysis as manufacturing process signals.

In some examples, the amount of compression applied during the electrode fabrication processes such as calendering in the process step 208 can affect the porosity of the electrode, which can be useful for further downstream processes, such as the electrolyte filling in the process step 222 of FIG. 2. For example, how fast or how easily the electrolyte will distribute and saturate throughout the cell may be based on the electrode's porosity. Using one or more devices such the Tx and Rx transducers shown in the system 100 to analyze the electrode during calendering, the time that the electrolyte is allowed to soak into the battery cell, the volume of the electrolyte injected into the battery cell, the temperature at which the soaking or other downstream processes are conducted such as process parameters related to the number of times vacuum is pulled during formation (e.g., process step 228), temperature at which the battery cells are stored for aging (e.g., process step 230), etc., can be determined or refined.

In some examples, electrolyte distribution and wetting characteristics can be analyzed, for example, using a set of Tx and/or Rx transducers placed along different locations of a battery cell during the process step 222. Using the acoustic signal information pertaining to the electrolyte distribution and wetting characteristics, feedback can be provided to influence the coating and calendering stages in the process steps 204, 208 if adjustments to the porosity or other properties of the electrodes may be identified or inferred during the process step 222. In some examples, the information may be fed forward from the process step 222, such as a determination of a certain level of wetting to be used to trigger the precharging in a safe manner in the process step 224 (e.g., it may be unsafe to conduct precharging too early before wetting is complete and dry spots remain).

In some examples, uneven electrolyte distribution or presence of dry spots can also lead to uneven SEI formation (e.g., on anode material particles) in the process step 228. Thus, uneven SEI formation observed using acoustic signal and/or process signal based analysis at the process step 228 can be fed back to the electrolyte filling in the process step 222, in addition to or as an alternative to using the electrolyte distribution information obtained from the process step 222 to improve the formation protocol in the process step 228, while also feeding that information back into electrolyte filling as well.

In some examples, the feedforward information from one process step to a subsequent downstream process step can influence quality of a same set or batch of battery cells. In some examples, the feedback information from manufacturing a current batch of battery cells may be useful in influencing the manufacturing processes of a subsequent batch of battery cells. For example, if issues are identified using acoustic signal and/or process signal based measurements during the aging of a batch of battery cells in the process step 230 or during Quality Control (QC) in the process step 232, this information may be used to improve one or more of the process steps 202-228 for a subsequent batch of battery cells. In some examples, the feedback information obtained about materials and components during manufacturing of one cell type (e.g., having a first form factor and/or first chemistry of battery cells) in one production line or facility may be useful for adapting processes during manufacturing of another cell type (e.g., having a second form factor and/or a second chemistry) in the same or in another production line or facility. In some examples, inline measurements can be instantaneously applied for improving process conditions, while in some examples, they may be used to create a reference database or a data repository of process conditions.

Figure 4:
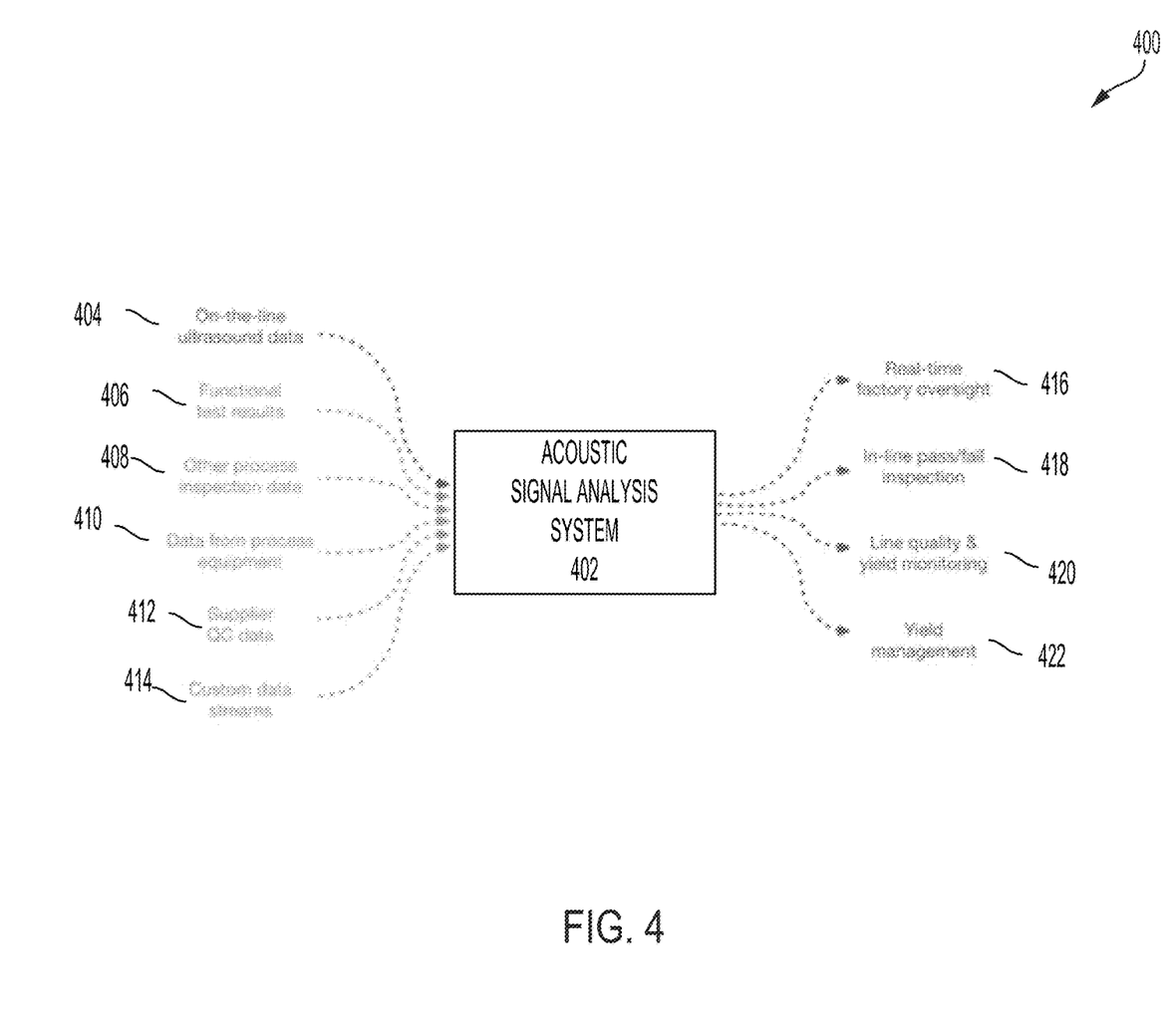
FIG. 4 illustrates a block diagram of a battery manufacturing analysis platform, according to aspects of this disclosure.

FIG. 4 illustrates a block diagram of a battery manufacturing analysis platform 400. In some examples, battery analysis platform 400 can include an acoustic signal analysis system 402 (e.g., system 100). In some examples, acoustic analysis system can include hardware and software components that can be used for collecting and analyzing data related to battery manufacturing and battery health. In some examples, acoustic signal analysis system 402 can perform electrochemical-acoustic signal interrogation (EASI), which can include hardware and software that is configured to determine the state and health of batteries and battery manufacturing processes, and to monitor those processes over time.

In some examples, EASI techniques can utilize a number of data processing and analysis techniques, including machine learning tools and concepts. These techniques can be applied to acoustic signal data, which the acoustic signal analysis system 402 can measure and collect, as well as any other manufacturing or battery data streams. In some aspects, acoustic signal analysis system 402 can include hardware for collecting acoustic data, as well as the software, algorithms, and data handling algorithms to provide data associated with batteries, battery components, and/or battery manufacturing processes.

In some examples, the inputs to acoustic signal analysis system 402 can include ultrasound data 404, functional test results 406, other process inspection data 408, data from process equipment 410, supplier quality control data 412, custom data streams 414, and/or any other data related to batteries and/or the battery manufacturing process. In some aspects, the outputs from acoustic signal analysis system 402 can include real-time factory oversight 416, in-line pass/fail inspection results 418, line quality and yield monitoring 420, yield management 422, and/or any other associated output parameter/metric associated with batteries and/or the battery manufacturing process.

Figure 5:
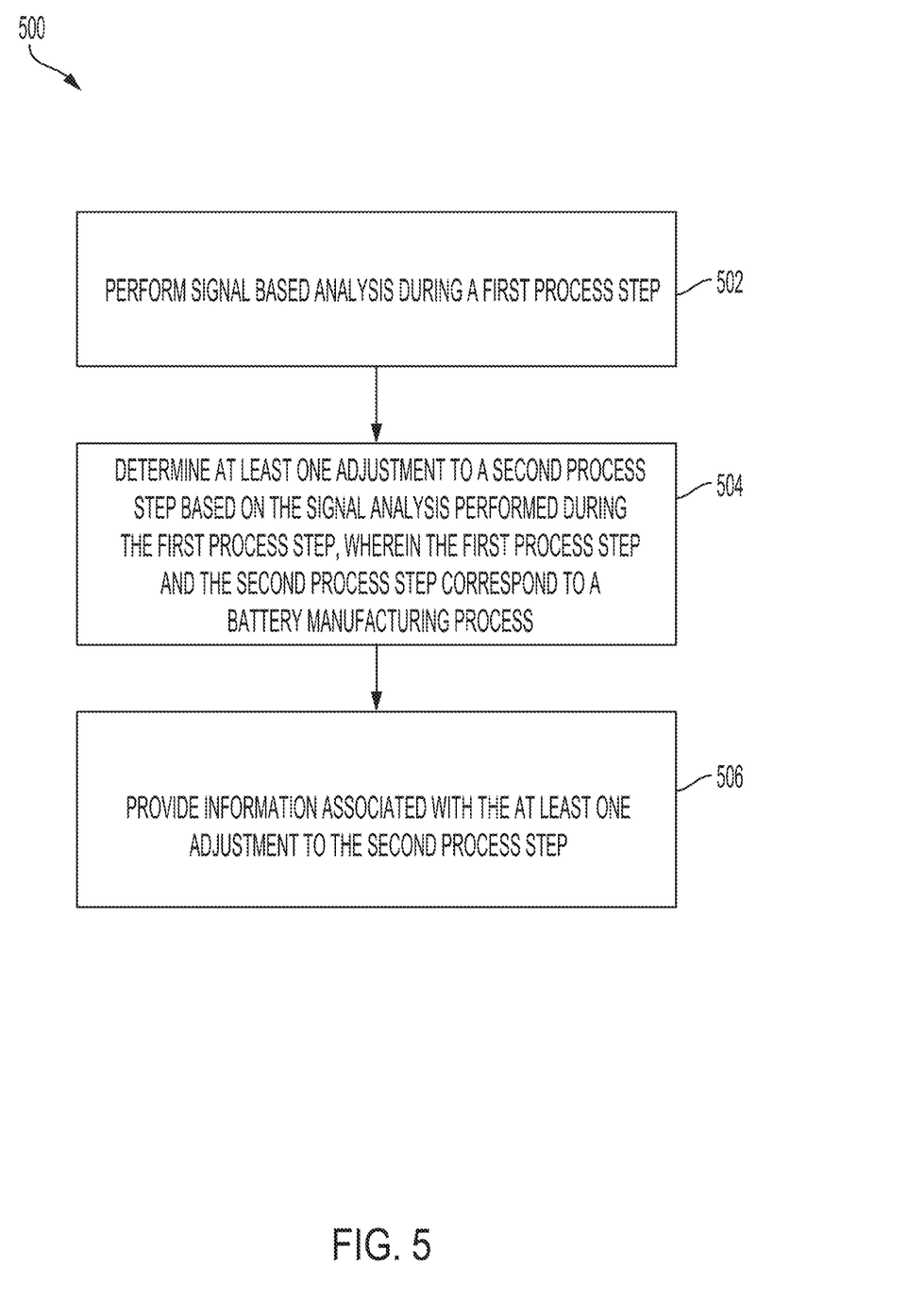
FIG. 5 illustrates an example method for controlling a battery manufacturing process, according to aspects of the present disclosure.

FIG. 5 is a flowchart illustrating an example method 500 for controlling a battery manufacturing process. The process of FIG. 5 may be implemented by apparatus 100 of FIG. 1 and components thereof such as processor 110. It will be apparent to those skilled in the art that processor 110 may have one or more memories (non-transitory computer-readable media) having computer-readable instructions stored thereon, which when executed by one or more processors, cause processor 110 to perform steps of FIG. 5.

At block 502, the method 500 includes performing signal based analysis during a first process step. In some examples, performing signal based analysis can include transmitting a first acoustic signal towards a component associated with the first process step, receiving at least a second acoustic signal corresponding to the first acoustic signal, and determining an acoustic parameter based on the first acoustic signal and the second acoustic signal. For example, Tx transducer 104 can be used to transmit an acoustic signal towards sample 102, and Rx transducer 106 can be used to receive a corresponding acoustic signal. In some aspects, processor 110 can be used (e.g., together with acoustic pulser/receiver 108) to determine an acoustic parameter based on the transmitted and received acoustic signals.

At block 502, the method includes determining at least one adjustment to a second process step based on the signal analysis performed during the first process step, wherein the first process step and the second process step correspond to a battery manufacturing process. In some examples, the at least one adjustment can be associated with at least one of a density of electrode slurry, a settling of electrode slurry, a coating thickness, a speed of a slurry coater, an oven drying time, and an oven drying temperature. In some aspects, the acoustic parameter can be used to determine that at least one manufacturing parameter is less than a threshold requirement, and the at least one adjustment can be configured to adjust the at least one manufacturing parameter (e.g., to meet a threshold requirement).

Figure 6:
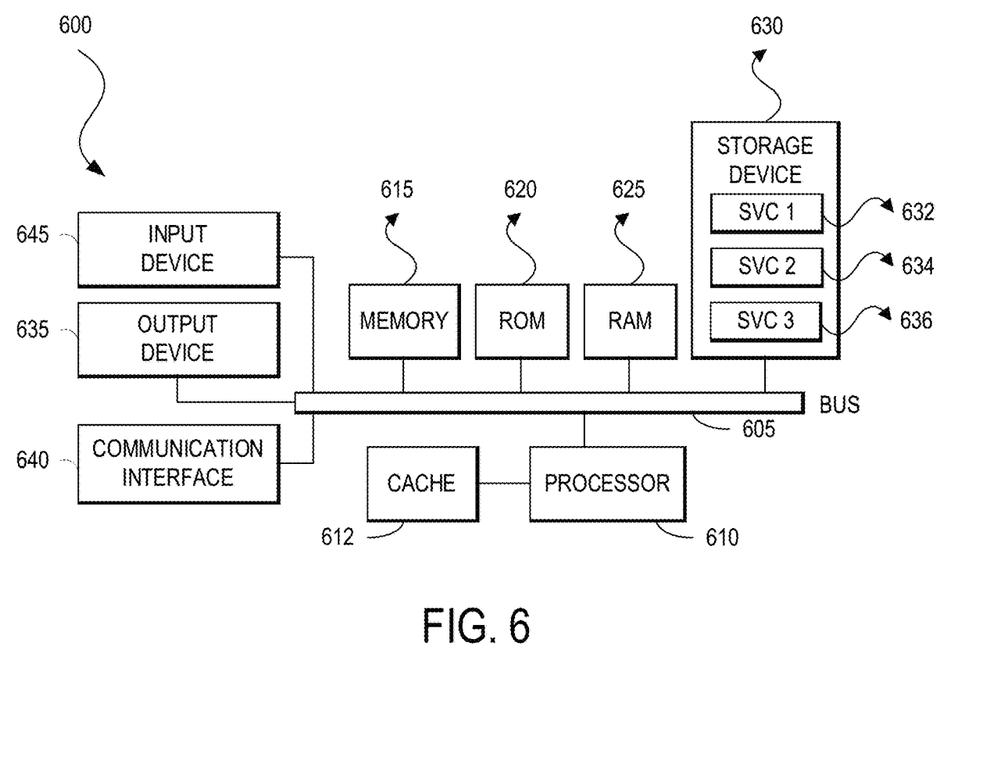
FIG. 6 illustrates an example system that can be utilized as processor of FIG. 1, according to aspects of the present disclosure.

At block 504, the method includes providing information associated with the at least one adjustment to the second process step. In some examples, the second process step can be prior to the first process step, and providing the information can include feedback. In some cases, the second process step can be subsequent to the first process step, and providing the information can include a feedforward. In some instances, the first process step and the second process step can correspond to a same process step in the battery manufacturing process. FIG. 6 illustrates example system that can be utilized as processor of FIG. 1, according to aspects of the present disclosure. Illustrated example systems can be used to implement processor 110 of FIG. 1. The more appropriate system will be apparent to those of ordinary skill in the art when practicing the various embodiments. Persons of ordinary skill in the art will also readily appreciate that other systems are possible.

FIG. 6 illustrates an example of a bus computing system 600 wherein the components of the system are in electrical communication with each other using a bus 605. The computing system 600 can include a processing unit (CPU or processor) 610 and a system bus 605 that may couple various system components including the system memory 615, read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as services (SVC) 1 632, SVC 2 634, and SVC 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software SVCs 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

While the foregoing disclosure shows illustrative aspects of the present technology, it should be noted that various changes and modifications could be made herein without departing from the scope of the present technology as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method of controlling a process of manufacturing an energy storage device using a controller that is communicatively coupled to one or more sensors, the method comprising:
   controlling the one or more sensors by the controller to transmit and receive acoustic signals into one or more components of the energy storage device during a first process step, wherein the first process step is one of a plurality of process steps for manufacturing the energy storage device that are performed in a given sequence;
   measuring one or more parameters associated with the first process step, wherein
      the measuring is performed by the controller using acoustic signals received by at least one of the one or more sensors, and
      the one or more parameters are indicative of a quality of manufacturing of the energy storage device during the first process step;
   determining at least one adjustment to a second process step of the plurality of process steps based on the one or more parameters measured with respect to the first process step, wherein
      the determining of the at least one adjustment is performed by the controller, and
      the at least one adjustment includes changes to one or more manufacturing parameters used during the second process step; and
   implementing the at least one adjustment at the second process step, by the controller.

2. The method of claim 1, wherein the second process step is prior to the first process step and implementing the at least one adjustment is based on a feedback to the second process step.

3. The method of claim 1, wherein the second process step is subsequent to the first process step and implementing the at least one adjustment is based on a feedforward to the second process step.

4. The method of claim 1, wherein the first process step and the second process step correspond to a same process step for manufacturing the energy storage device.

5. The method of claim 1, wherein controlling the one or more sensors comprises:
   transmitting a first acoustic signal to the one or more components of the energy storage device during the first process step; and
   receiving at least a second acoustic signal in response to the first acoustic signal; wherein
   the one or more parameters are measured based on at least the first acoustic signal and the second acoustic signal.

6. The method of claim 5, further comprising:
   determining, based on the one or more parameter, that at least one of the one or more manufacturing parameters is less than a threshold requirement, wherein the at least one adjustment is configured to adjust the at least one of the one or more manufacturing parameters.

7. The method of claim 1, wherein the at least one adjustment is associated with at least one of a density of electrode slurry, a settling of the electrode slurry, a coating thickness, a speed of a slurry coater, an oven drying time, and an oven drying temperature.

* * * * *